United States Patent [19]

Etoh

[11] Patent Number: 4,823,362

[45] Date of Patent: * Apr. 18, 1989

[54] BLOCK SYNCHRONIZATION DATA COMMUNICATION UNIT IN MOBILE RADIO

[75] Inventor: Hiroshi Etoh, Tokyo, Japan

[73] Assignee: Oki Electric Industry Co., Ltd., Tokyo, Japan

[*] Notice: The portion of the term of this patent subsequent to Sep. 15, 2004 has been disclaimed.

[21] Appl. No.: 66,737

[22] Filed: Jun. 25, 1987

Related U.S. Application Data

[62] Division of Ser. No. 833,716, Feb. 27, 1986, Pat. No. 4,694,473.

[30] Foreign Application Priority Data

Mar. 8, 1985 [JP] Japan .................................. 60-44741

[51] Int. Cl.[4] .............................................. H04L 7/00
[52] U.S. Cl. ..................................... 375/116; 371/42; 379/59
[58] Field of Search .................. 375/114, 116; 371/42; 370/106; 379/59

[56] References Cited

U.S. PATENT DOCUMENTS 4,694,473  9/1987  Etoh ..................................... 375/114

Primary Examiner—Benedict V. Safourek
Assistant Examiner—Marianne Huseman
Attorney, Agent, or Firm—Wenderoth, Lind & Ponack

[57] ABSTRACT

A block synchronization data communication unit enables data communication to be properly effected even through a transmission channel under an extremely unfavorable condition as in mobile radio. The block synchronization data communication unit in mobile radio comprises means for encoding data to be transmitted and blocking the encoded data, means for adding a block synchronization signal having a plurality of different successive patterns positioned in a prescribed order to the head of the blocked data, means for transmitting the blocked data added with said block synchronization signal, means for receiving data transmitted, means for recognizing one of patterns constituting the block synchronization signal in the received data, means for estimating the data position based on a block synchronization signal constitution position of the recognized pattern, and means for decoding the blocked data beginning from the estimated position as received data.

1 Claim, 9 Drawing Sheets

BLOCK SYNCHRONIZATION DATA COMMUNICATION UNIT IN MOBILE RADIO

RELATED APPLICATION

This application is a divisional application of copending U.S. patent application Ser. No. 833,716 filed on Feb. 27, 1986 for "DATA COMMUNICATION SYSTEM WITH BLOCK SYNCHRONIZATION DATA IN MOBILE RADIO" now U.S. Pat. No. 4,694,473.

BACKGROUND OF THE INVENTION

1. Field of the Invention

The present invention relates to a data communication unit for use in mobile radio such as that in automobiles, and more particularly to a communication system with use of a block synchronization signal.

2. Description of the Prior Art

A mobile phone system is now commercially available in Japan, Canada, and various countries in Europe, the United State of America, but data communication with mobile radio has, at long last, begun to be put into a practical use. The data communication with mobile radio is mediated through a transmission channel under a severe handicap such as fading. Thus, such data communication may suffer from errors. To solve the problem, the data in question is commonly subjected to error correction encoding and is blocked for transmission. A communication system of such types of error correction is called a block synchronization transmission system in which block data signal. Many methods have been proposed up to now for such systems. An example is described in "Computer-Data communication Techniques"—The Elements In Data Communication—, written by E. Macnamara, translated by Hiroyuki Watanabe from CQ Publishing Co., Ltd., PP 138 to 141, wherein two methods are given. One of them a block synchronization signal with a single pattern having an arbitrary bit length and employs it one at a time for transmission. The other transmits the pattern three times or more in repetition and identifies it as being a proper block synchronization signal provided that it is received two times or more in succession. In addition, another technique is given in "Advanced Mobile Phone Service: Control Architecture" by Z. C. Fluhr et al, *THE BELL SYSTEM TECHNICAL JOURNAL,* JANUARY 1979, which describes a data format in data communication (P58, FIGS. 8 and 9). However, only with a single pattern, it is not recognized as a block synchronization if it is received by mistake. Likewise, with a single pattern transmitted in a plurality of times, it can be not decided with ease from which portion a data fraction begins in the signal if the pattern is received by mistake.

SUMMARY OF THE INVENTION

It is an object of the present invention to provide a data communication unit for effecting block synchronization data communication capable of transmitting and receiving block data in a proper synchronized relation via an extremely bad-conditioned transmission channel as in mobile radio such as that in automobiles.

A block synchronization data communication unit in mobile radio according to the present invention comprises:

(1) means for encoding data to be transmitted and blocking the encoded data, (2) means for adding a block synchronization signal having a plurality of different successive patterns positioned in a prescribed order to the head of the blocked data, (3) means for transmitting the blocked data added with the block synchronization signal, (4) means for receiving data transmitted, (5) means for recognizing one of patterns constituting the block synchronization signal in the received data, (6) means for entimating the data position based on a block synchronization signal constitution position of the recognized pattern, and (7) means for decoding the blocked data beginning from the estimated position as received data, The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 3a–3d are views illustrating a block synchronization system according to the present invention, FIGS. 4a1–4a3 represent a circuit block diagram of a data modem on the land side with use of the block synchronization system according to the present invention, and FIGS. 4b1–4b3 represent a circuit block diagram of a mobile cellular modem with use of the system according to the present invention.

DESCRIPTION OF THE PREFERRED EMBODIMENT

Figure 1:
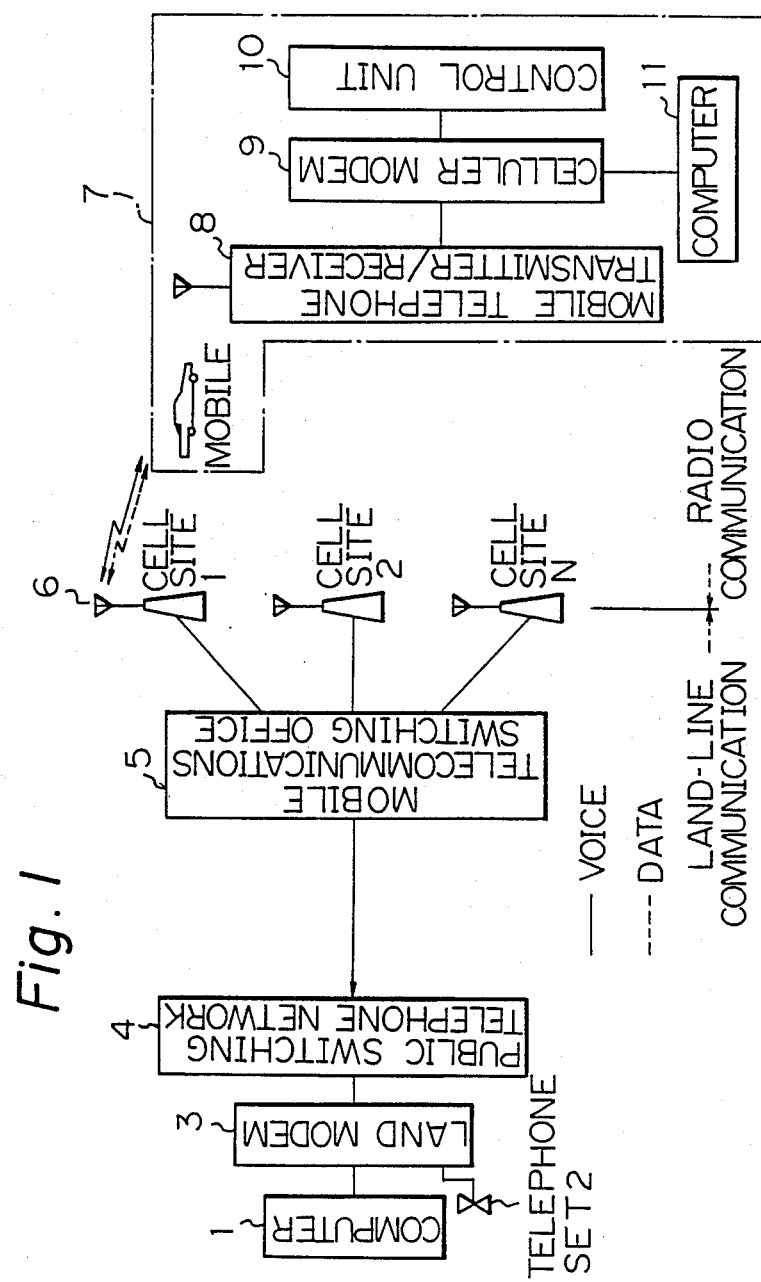
FIG. 1 is a schematical view illustrating a data communication system in mobile radio.

In FIG. 1, illustrating a data communication system in mobile radio, designated at 1 is a computer, 2 is a telephone set, 3 is a land modem, 4 is a public switching telephone network 5 is a mobile telecommunications switching office (MTSO), 6 is a cell site, 7 is a mobile, 8 is a mobile telephone transmitter/receiver unit (TRU), 9 is a cellular modem, 10 is a control unit (CU), and 11 is a computer. The above members from the computer 1 to the cell site 6 are located on the land side, while those from the TRU8 to the computer 11 are carried on the mobile 7.

Referring to FIG. 1, data communication between the computer 1 on the land side and the computer 11 carried on the mobile 7 will be described. Although the computer 1 and the telephone set 2 are connected with the land modem 3, the computer 1 is connected with the land modem 3 by switching the system to a data mode. Data from the computer 1 is supplied in a block unit to the land modem 3 in which it is subjected to error correction encoding, and then fed to the public switching telephone network 4. The data is further allowed to pass, via the MTSO 5 and the cell site 6, through a radio communication interval, and received by the mobile phone transmitter/receiver unit (TRU)8 of the mobile 7. The received data is subjected to decoding, etc., by the cellular modem 9 which then delivers the data to the computer 11 as the data is decided to be normal. Provided that the received data is decided to be an erroneous one, the mobile side requests the land side to retransmit the same block data. Effecting the above procedure in repetition block data is transferred from the computer 1 on the land side to the cellular modem 9 of the mobile 7. The same procedure is effected also when, in contrast with the situation, data is transmitted from the computer 11 of the mobile 7 to the computer 1 on the land side. Moreover, communication can also be achieved by phone between the telephone set 2 and the control unit (hand set) 10 of the mobile 7.

It is general in a data communication system in mobile radio to employ a block synchronization signal to transfer block data.

Figure 2:
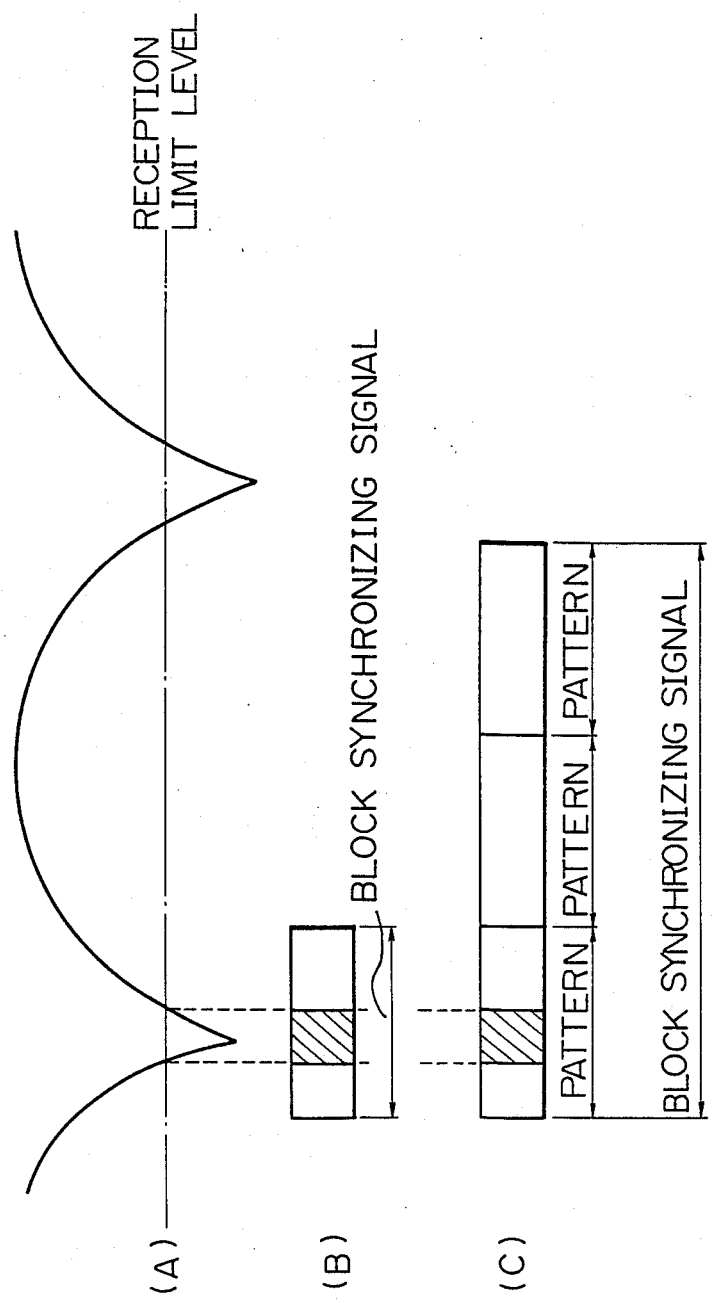
FIG. 2 is a view illustrating a prior block synchronization system.

Prior to describing the block synchronization communication system according to the present invention, a conventional method such, for example, as those described in the literature mentioned before, etc., will be described with reference to FIG. 2. As shown in FIG. 2 showing fading experienced by a signal in mobile radio, a signal higher than a reception limit level can be received without any error, whereas that lower than the level can be received by mistake. In case of FIG. 2(B) illustrating an example wherein a block synchronizing signal comprises a signal pattern, a hatched portion of the signal is not properly recognized as a block synchronization signal since that portion is erroneously received. On the other hand, another block synchronization communication system is shown in FIG. 2(C) wherein the same pattern in transmitted three times in repetition, and the data is recognized as a proper block synchronization signal provided that two succeeding patterns can be found. Namely, although the first of the patterns is not properly recognized as a synchronization signal because of its erroneous reception, the second and third patterns are recognized as a block synchronization signal because of their proper reception. However, when a block synchronization signal only comprises a single pattern as shown in FIG. 2(B), the signal is not recognized as a block synchronization signal provided that it is received by mistake, while in case of FIG. 2(C) it is difficult to decide at what position a sequence of the properly recognized block synchronization signal is located among the three block synchronization signals.

Against this, with the block synchronization system according to the present invention, a plurality of different subsequent patterns construct a block synchronization signal, and a pattern constituting the block synchronization signal is recognized on the receiving side, and a data position is estimated based on the properly recognized pattern position for block synchronization.

Figure 3:
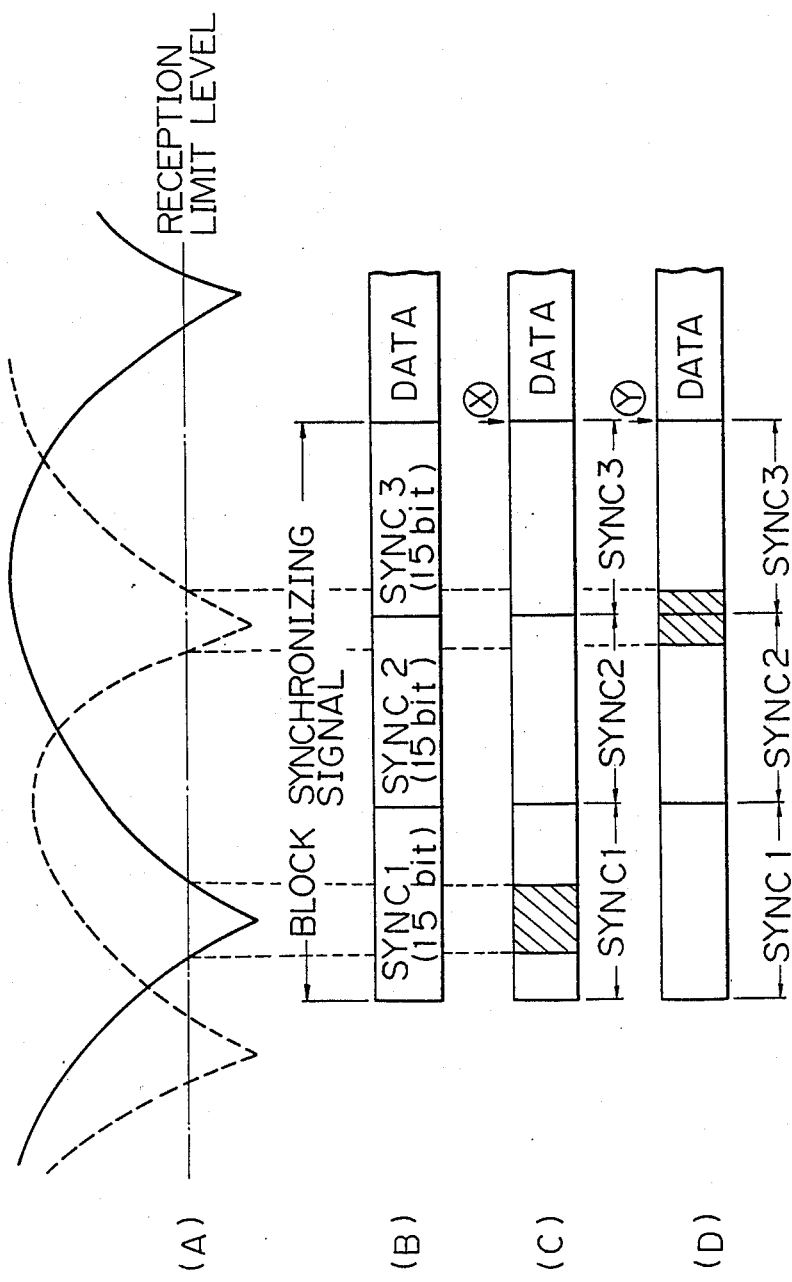

In FIG. 3 illustrating a block synchronization communication system according to the present invention, solid and dotted curved lines of FIG. 3(A) respectively shown signal fading and a straight line on the horizontal axis represents a reception limit level. A block synchronization signal for use in the present embodiment is shown in FIG. 3(B), which comprises three kinds of successive patterns of SYNC1, SYNC2, and SYNC3 each being composed of 15 bits. SYNC1, for example, employs "111101011001000", SYNC2 "000010100110111" and SYNC3 "000100110101111". The receiving side supervises the three kinds of the patterns of SYNC1, SYNC2, and SYNC3. The receiving side recognizes any pattern thereamong for detecting the position of the pattern in the block synchronization signal, and estimates the first position of the data in question.

Let us, for example, consider here a case wherein a block synchronization signal shown in FIG. 3(B) is received as shown in FIG. 3(C) under a fading pattern shown by a solid line FIG. 3(A). It is assumed that the pattern of SYNC1 including a portion less than the reception limit level is erroneously received while the other patterns of SYNC2 and SYNC3 are received properly. In the instance, the data in question is decided to begin on and after 16th bit (from the position of X on) since the pattern of SYNC2 previously properly recognized could be properly recognized (There is no problem even if SYNC3 is erroneous).

Then, let us consider a case wherein the block synchronization signal shown in FIG. 3(B) is received as shown in FIG. 3(D) under a fading pattern shown by dotted line in FIG. 3(A). The patterns of SYNC2 and SYNC3 including a portion less than the reception limit level are erroneously received while the pattern of SYNC1 is properly received. Accordingly, in this case, the data in question is decided to begin on and after the 31th bit (from the position of Y on) since SYNC1 was recognized.

Figures 1, 4A:
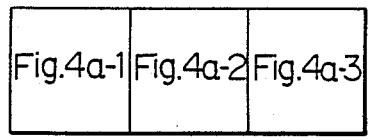
Figure 4A:
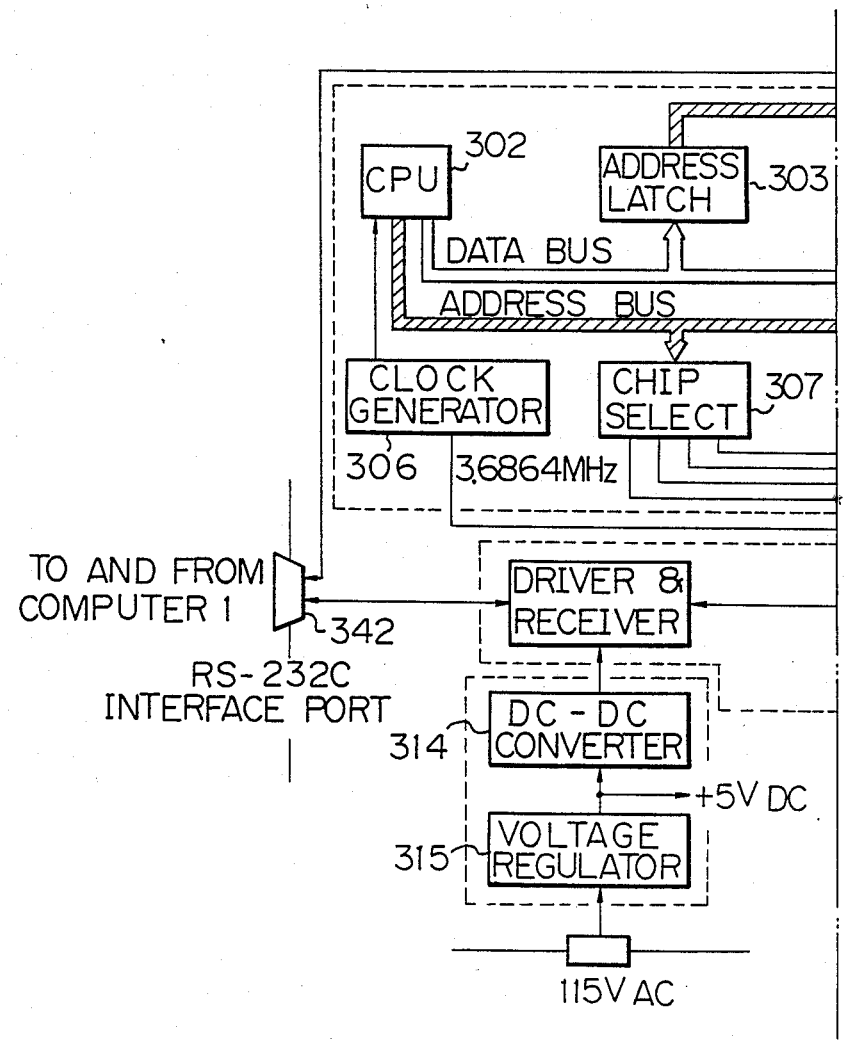
Figures 2, 4A:
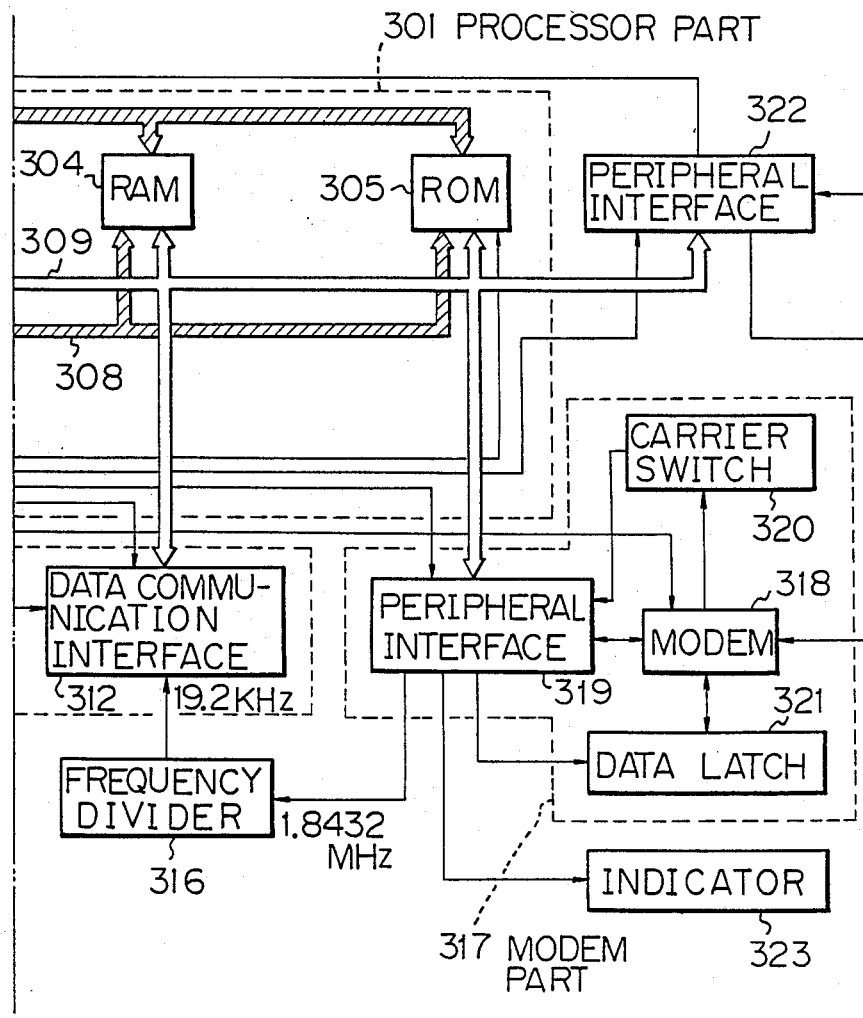
Figures 3, 4A:
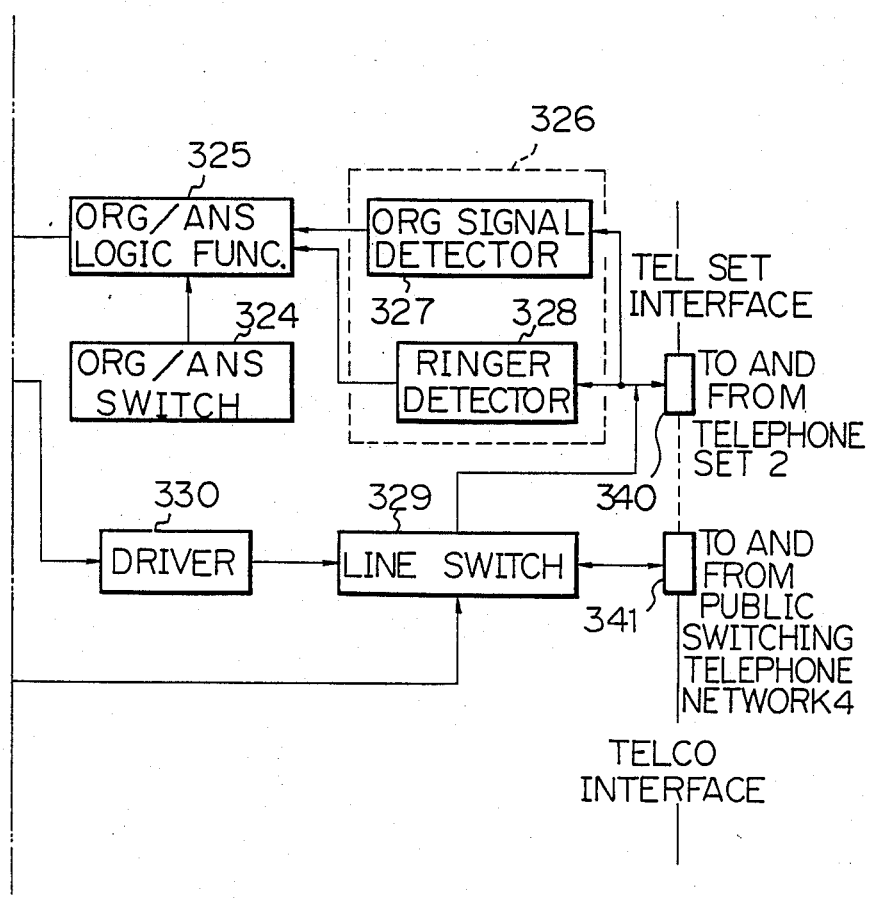

The block synchronization transmission system according to the present invention is employed in both devices of the data modem 3 on the land side and the cellulor modem 9 of the mobile 7, as shown in FIG. 1. Circuit block diagrams of the land modem 3 and the cellular modem 9 are respectively shown in FIGS. 4a and 4b, wherein designated at 301 is a processor, 310 is a RS-232C interface, 313 is a power supply and 317 a modem. A computer 1 is connected with a RS-232C interface port 342, a telephone set 2 connected with a TELSET interface 340, and a public switching telephone network 4 connected with a TELCO interface 341, as shown in the same figure.

Operation of data transmission from the land modem 3 on the land side to the mobile 7 will be described below.

First, a switch 324 is operated whereby whether the mode in question is transmission one or a reception one is detected in an ORG/ANS Logic Func. part 325. The present case is set to transmission. The transmission mode is supplied to a CPU302 of the processor 301 via a peripheral interface 322, whereby the CPU302 is informed of a start of the transmission. Then, the CPU302 interrogates the RS-232C interface 310 about whether the computer 1 connected the RS-232C interface 310 is ready or not. Then, data to be delivered from the computer 1 is incorporated in a RAM304 via the processor part 301 and the RS-232C interface 310, and subjected to error correction encoding for preparing block data. In case of data communication through the telephone, since the land modem 3 is connected to the telephone 2 via the TELSET interface 340, a line switch 329 is, upon initiating the data communication, switched to the TELCO interface 341 whereby the land modem 3 is connected with the public switching telephone network 4. The CPU302 waits an ACK signal (reception-ready signal) from the mobile 7 on the receiving side. The ACK signal is entered in the land modem 3 via the TELCO interface 341, demodulated by a modem part 317, and incorporated in the processor 301 via the peripheral interface 319. The modem 317 is a well known type and so operation thereof will not be described here. The CPU 302, upon receiving the ACK signal, starts to transmit the blocked data which has already been stored on the RAM 304. Furthermore, the CPU302, upon transmitting each block data, adds a block synchronization signal to the head thereof. The block synchronization signal comprises three kinds of patterns of SYNC1, SYNC2, and SYNC3 each pattern being composed of 15 bits, as shown in FIG. 3(B). The block data added with the block synchronization signal is delivered to the public switching telephone network 4 via the RAM 304, a peripheral interface 319, a modem 318, the line switch 329, and the TELCO interface 341, and transmitted to the mobile 7 via the MTSO5 and the cell site 6. Successive data from the computer 1 are likewise subjected to error correction encoding and added with a block synchronization signal in the RAM 304 for transmission.

Figure 4B:
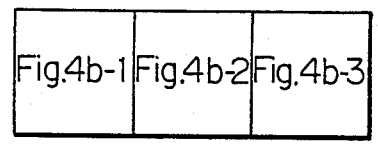
Figure 1:
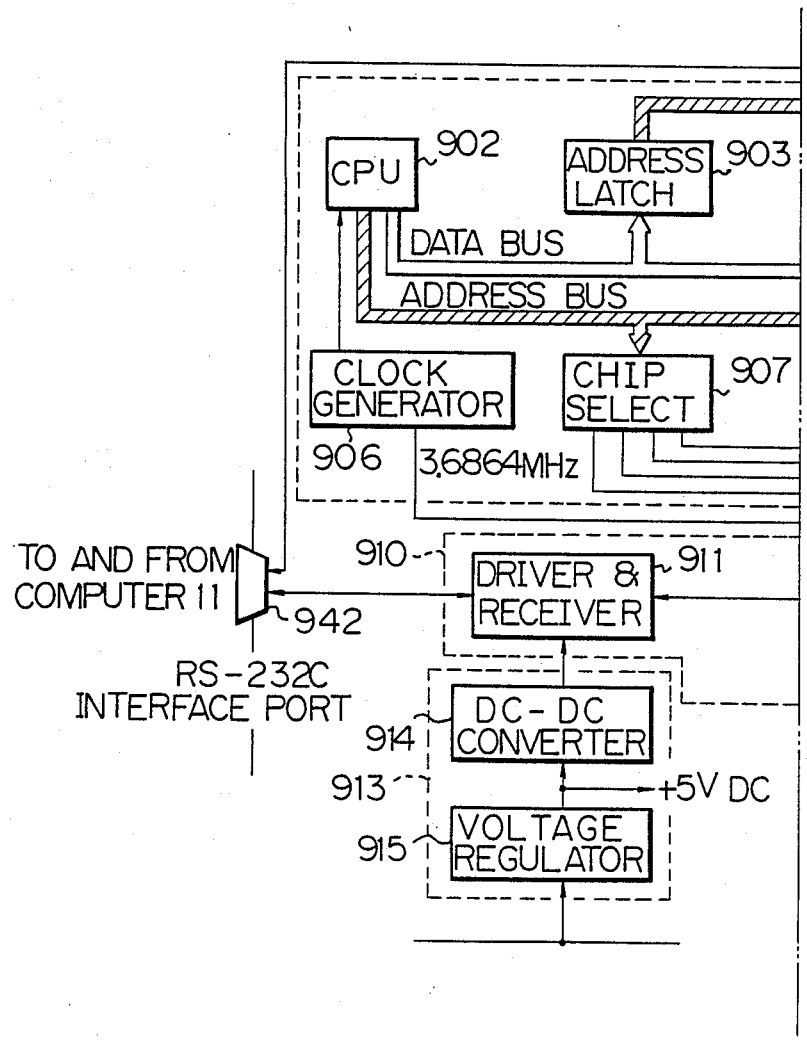
Figures 2, 4B:
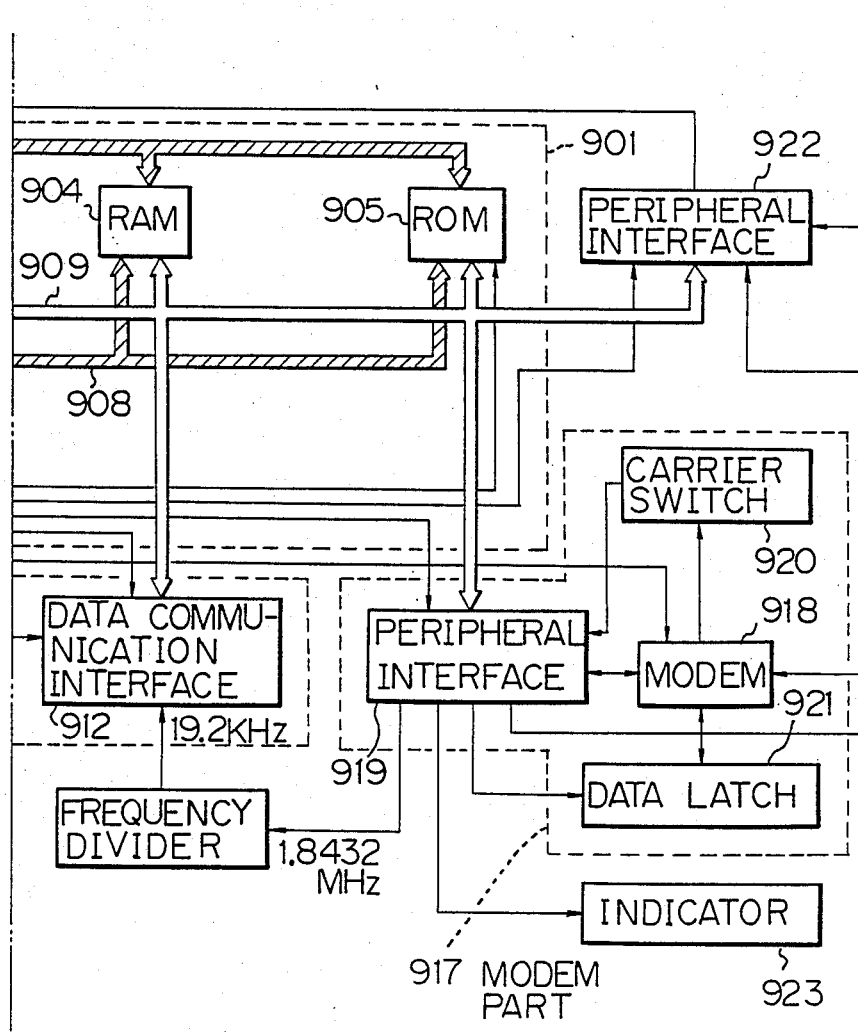
Figures 3, 4B:
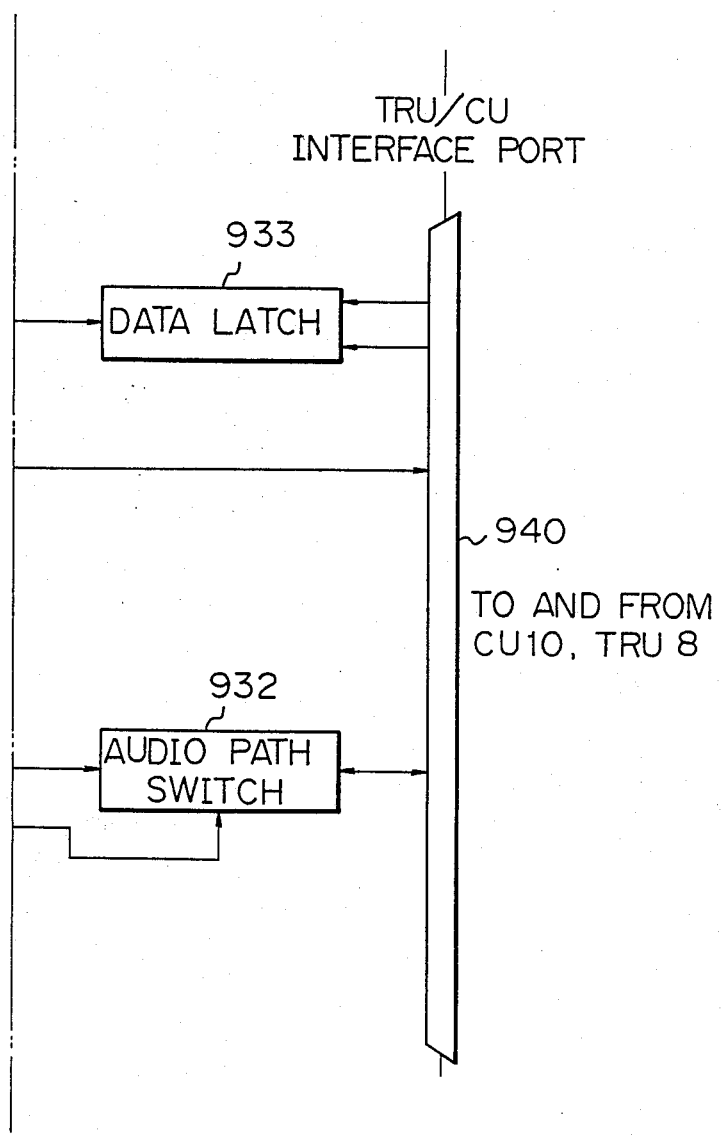

Operation of the mobile 7 which receives the transmitted data will be described with reference to FIGS. 1 and 4b. The transmitted data is received by the mobile phone transmitted receiver unit 8 of the mobile 7 and transferred to the cellular modem 9. As shown in FIG. 4b, designated at 901 is a processor part, 910 is a RS-232C interface, 913 is a power supply and 917 is a modem. The computer 11 of FIG. 1 is connected with a RS-232C interface port 942, and the mobile phone transmitted receiver unit (TRU) 8 and the control unit (CU) 10 are connected with a TRU/CU interface port 940. The data received by the mobile phone transmitter/receiver unit (TRU) 8 is supplied to the modem 917 via the TRU/CU interface port and an audio path switch 932. The modem 917 demodulates the received modulated data and delivers it to the RAM 904 of the processor 901 via a peripheral interface 919. Here, the audio path switch 932 serves to switch a path for an audio signal between the data mode and the conversational mode. The CPU 902 decodes the data sent to the RAM 904. In succession, for the received data, it is checked whether the data is a block synchronization signal or not. It is investigated at what position any of same patterns as those three kinds of the block synchronization signal (SYNC patterns) each pattern comprising 15 bits shown in FIG. 3(B) are in the received data. The processor 901 decides, as described in FIG. 3(C), based on the pattern of SYNC 2 as properly recognized, that the data in question begins on and after the 16th bit (shown by x) from that pattern, while the processor 901, if it properly recognizes the pattern of SYNC 1 as shown in FIG. 3(D), decides that the data begins on and after the 31th bit from that pattern (shown by Y in the FIGURE). The received data is decoded and is, if properly received, delivered to the computer II via the RS-232C interface 910 and the RS-232C interface port 942. Likewise, data transmitted from the computer 1 on the land side are transmitted in succession to the computer II on the mobile. Also in a case where any data is transmitted from the computer II on the mobile side to the computer 1 on the land side, the same procedure as described above can be effected.

Although in the above embodiments, the block synchronization signal is composed of the three kinds of successive patterns of SYNC 1, SYNC 2, and SYNC3, a block synchronization signal composed of two kinds of patterns or three kinds or more of patterns will be likewise applied.

According to the present invention, as described above, since a block synchronization signal is constituted by a plurality of patterns, provided that only one thereamong can be recognized, the block synchronization signal can be recognized even if the remaining patterns are erroneous. In addition, it can be advantageously decided from that position the data in question begins.

The present invention can profitably employed for all data communication where fading in a mobile phone, etc., is troubled.

Although a certain preferred embodiment has been shown and described, it should be understood that many changes and modifications may be made therein without departing from the scope of the appended claims.

What is claimed is:

1. A block synchronization data communication unit in a mobile radio comprising:
   (1) a transmitting part including:
      (a) a means for encoding data and forming said data into blocks to be transmitted;
      (b) a means for adding a block synchronization signal, having a plurality of different successive patterns positioned in a prescribed order, to said data formed into blocks;
      (c) a circuit means for modulating said data formed into blocks with said block synchronization signal, and
   (2) a receiving part including:
      (a) a receiver means for receiving data;
      (b) a circuit means for demodulating said received data;
      (c) a means for decoding said demodulated received data; and
      (d) a means for recognizing one of said patterns constituting said block synchronization signal and for estimating the data position based on a position of said recognized pattern in said plurality of different successive patterns.

* * * * *